May 17, 1960  R. B. MARSH  2,936,915
POWER ACTUATED BOAT LOADING DEVICE
Filed May 12, 1958  2 Sheets-Sheet 1
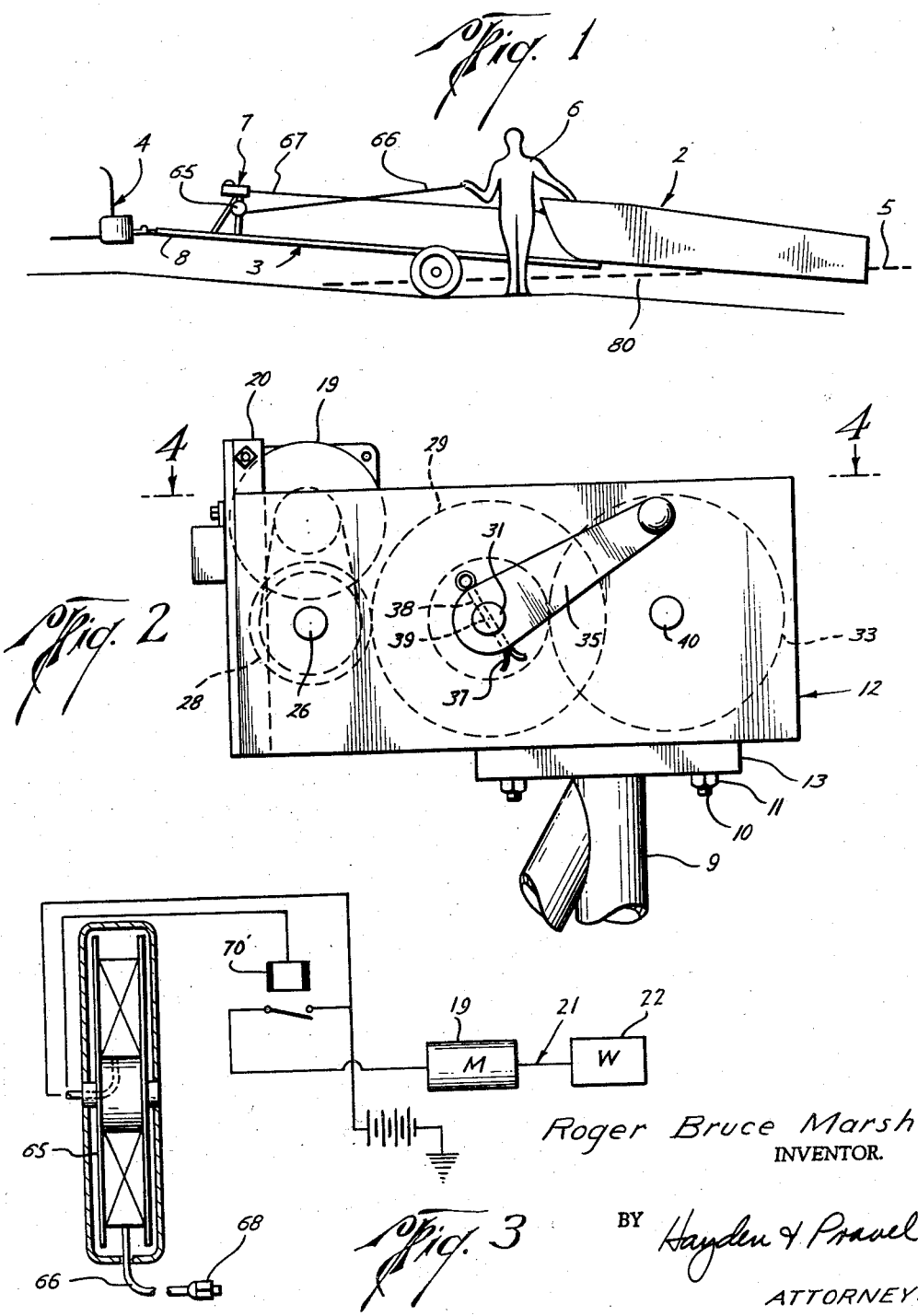
Roger Bruce Marsh
INVENTOR.
BY Hayden & Pravel
ATTORNEYS

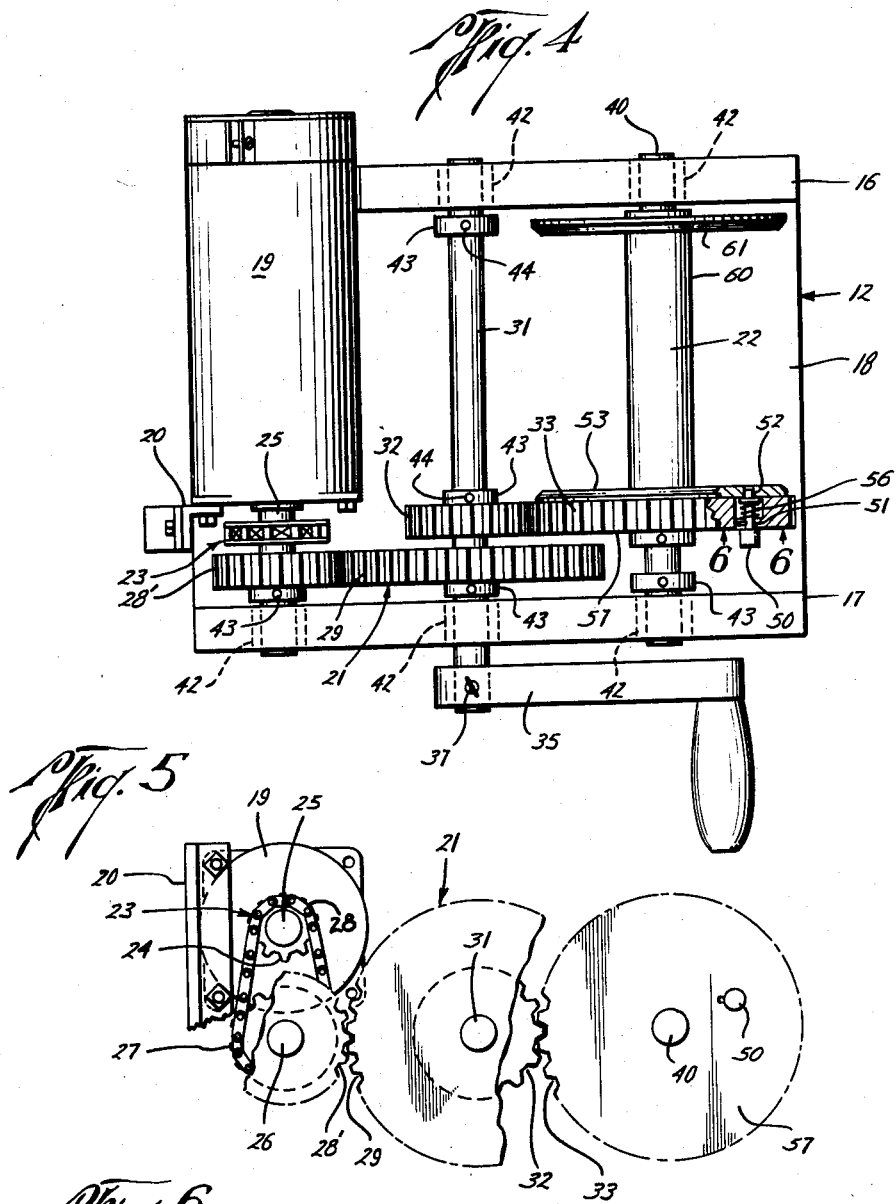
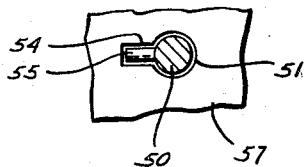

United States Patent Office 2,936,915
Patented May 17, 1960

2,936,915

POWER ACTUATED BOAT LOADING DEVICE

Roger B. Marsh, Houston, Tex.

Application May 12, 1958, Serial No. 734,660

6 Claims. (Cl. 214—85.1)

The present invention relates to a device to aid in loading trailers and more particularly, to a device for use to aid in loading or landing small boats and craft from the water on a trailer.

Various power devices have been proposed and are in use at the present time to aid in loading or landing a boat from the water onto a trailer so that the boat can be moved on land. Generally speaking, all of the devices presently in use are expensive mechanisms which are costly to install and also require continual maintenance and upkeep. Furthermore, such devices are constructed and arranged so that more than one person is generally required to aid in loading the boat onto the trailer.

The present invention is directed to a device which is relatively inexpensive, yet fool-proof in operation. Furthermore, the present invention provides a device which enables a boat to be loaded onto a trailer quite readily with only one person operating the device.

An object therefore of the present invention is to provide a device for loading a boat on a trailer.

Another object of the present invention is to provide a device which is relatively inexpensive for loading a boat on a trailer and which can be operated by one person.

Still a further object of the present invention is to provide a device for loading a boat on a trailer wherein power means are provided for operating a reel on which a cable is wound and adapted to be attached to a boat, and additional means for actuating the power means at a remote location relative to the power means, but adjacent the boat so that the operator of the device can stand adjacent the boat as it is being loaded onto the trailer to guide it into position on the trailer.

Yet a further object of the present invention is to provide a power operated device for loading a boat on a trailer, wherein the means for controlling the power to operate the device to load the boat permits the operator of the device to be continually positioned adjacent the boat at a desired location so that the operator can aid in guiding the boat onto the trailer as the device is actuated.

Other objects and advantages of the present invention will become readily apparent from a consideration of the following description and drawings, wherein:

Fig. 1 is a side view, schematically representing a trailer and a boat being loaded thereon to show the present invention and its manner of use;

Fig. 2 is a side view of the present invention;

Fig. 3 is a schematic wiring diagram of the present invention;

Fig. 4 is a top plan view showing the construction of a portion of the present invention;

Fig. 5 is a view showing in more detail, the arrangement of the power means and the gear means for actuating the reel; and Fig. 6 is a sectional view on the line 6—6 of Fig. 4, to more clearly illustrate a means for connecting and disconnecting the gear means relative to the cable reel.

Attention is directed to Fig. 1 of the drawings, wherein a boat is illustrated generally at 2, and a trailer illustrated generally at 3 is shown as being attached to a vehicle 4. It will be noted that the boat 2 is being landed or loaded onto the trailer 3 directly from the water 5 by the operator 6. The present invention is illustrated generally at 7 and it will be noted that the present invention permits the operator 6 to be stationed or located adjacent the forward end of the boat at the rear of the trailer and to move alongside the trailer as the boat moves up into seating position thereon.

More particularly, it will be noted that the present invention denoted generally at 7 is positioned on the trailer 3 at the forward end 8 thereof, and as shown in the drawings, is mounted on the vertical support or frame members 9 of the trailer 8 by any suitable means such as bolts 10 and nuts 11, which secure the support designated generally at 12 to the plate 13 on the upper end of the vertical member 9.

The support designated generally at 12 is shown as including the spaced side plates 16 and 17, which are secured to the base plate 18 of the support 12.

The upwardly extending side plates 16 and 17 are spaced as more clearly illustrated in the drawings to provide a means for receiving and supporting the other structural components of the device. A motor illustrated at 19 is mounted on the frame 12 and secured thereto by any suitable means such as the bracket 20 which is secured to the motor 19 and to the frame 12, as shown in the drawings. Suitable gear means as illustrated generally at 21 are provided for connecting the motor 19 to the reel or winch designated at 22, and a drive connection as shown generally at 23 is provided between the motor 19 and the gear means 21 to effect rotation of the gear means and the reel or winch 22.

As shown in the drawings, the drive means 23 assumes the form of a sprocket 24 mounted on the shaft 25 of the motor 19. A shaft 26 is rotatably supported by suitable bearing means at each of its ends in plates 16 and 17, and is arranged below the motor 19. A sprocket 27 is provided thereon and the chain 28 is connected between the sprocket 24 and the sprocket 27 to effect rotation of the sprocket 27 by means of the motor 19.

As previously mentioned, the sprocket 27 is mounted on the shaft 26 and rotation of the sprocket 27 rotates the shaft 26 on which is mounted the gear 28' forming part of the gear means designated generally by 21. The gear 28' meshes with and rotates the gear 29, the gear 29 being mounted on the shaft 31, which is also rotatably mounted in each of the side plates 16 and 17, as more clearly shown in Fig. 4 of the drawings. The gear 29 rotates the shaft 31 and thereby rotates the gear 32 positioned thereon, which is intermeshed with the drive gear 33 connected to the reel or winch 22.

Thus, when power is supplied to the motor 19, the drive connection 23 is rotated, which in turn rotates the gear 28', the gear 29, the gear 32, and the drive gear 33, so as to effect rotation of the winch or reel 22.

It will be noted that the shaft 31 projects outwardly through and relative to one of the side plates, such as the side plate 17 as shown in Fig. 4 of the drawings and, if desired, a crank lever as shown at 35 may be positioned on the shaft 31 for manual rotation of the reel 22 in the event of a power failure or other emergency. When the crank lever 35 is not in use, it may be removed from the end of the shaft 31. The crank lever 35 may be connected on the end of the shaft 31 by any suitable means such as the cotter pin 37 which is adapted to engage through the opening 38 in the end of the lever 35, and the opening 39 in the end of the shaft 31.

It will be noted that the reel 22 is rotatably mounted in the support 12 by means of the shaft 40 which is supported in each of the upwardly extending plates 16 and 17, the same as previously described with regard to the shafts 25 and 31. Suitable sleeve bearings as shown at 42 may be provided in each of the plates 16 and 17 for rotatably supporting the shafts 26, 31 and 40 respectively. Also, rings 43 may be provided adjacent each end of the shafts to aid in locating and maintaining the shafts in position within the support 12. Suitable means such as Allen set screws 44 may be provided for locking the rings 43 in position on each of the shafts.

Suitable means are provided for connecting the drive gear 33 of the gear train 21 to the winch 22, as more clearly illustrated in Figs. 4 and 6 of the drawings. It will be noted that as shown in the drawings, the pin 50 extends through the opening 51 of the gear 33 and into the opening 52 in the side plate 53 of the winch 22. The opening 51 is provided with a groove 54, in which fits the projection 55 on the pin 50 which aids in locking the gear 33 and the plate 53 of the winch 22 together when the pin 50 is positioned within the opening as shown in Fig. 4. Additionally, suitable spring means 56 is provided which continually urges the pin 50 towards seating position in the opening 51 and opening 52. When it is desired to release the winch 22 relative to the drive gear 33, the pin 50 may be pulled outwardly relative to the drive gear 33 and rotated so that the projection 55 rests on the surface 57 of the gear 33.

It will be noted that the reel 22 is rotatably supported on the shaft 40 by means of the housing 60, which is connected at one of its ends to the side plate 53 and its other end to the side plate 61 of the reel 22. The housing 60 is rotatable relative to shaft 40 and, therefore, when the pin 50 is retracted from the opening 51 and the opening 52 in the side plate 53 and rotated so that the projection 55 rests on the surface 57 of gear 33, the reel 22 is free to rotate relative to the drive gear 33 and shaft 40.

An electric cord reel is shown at 65 as being mounted on the vertical member 9 of the trailer 3 and an electrical conductor as shown at 66 is adapted to be received thereon. The electrical conductor 66 is electrically connected to the motor 19 and to a suitable source of electrical energy, such as the battery of the vehicle 4, for activating the reel 22 to rotate it so as to wind the cable as shown at 67 in Fig. 1 on the reel, whereby the boat 2 may be pulled up on the trailer 3.

As previously mentioned, one of the problems with power actuated boat loading devices has been that it is necessary for the operator of the device to be positioned relative to the boat so that the boat can be guided onto the trailer as it moves from the water on to the trailer. The devices presently in use provide no means for simultaneously activating the device and also permitting an operator to be located relative to the boat and to the power source so that the operator can guide the boat onto the trailer.

The present invention overcomes this problem, in that the electrical conductor can be first of all unwound from the reel 65 so that the operator can assume an initial position as shown in Fig. 1 of the drawings, adjacent the end of the trailer 3, and adjacent the boat which is hooked onto the end of the cable 67 mounted on reel 22. The conductor 66 is provided with a switch means 68 in the end thereof, and when this switch is closed the motor 19 is activated, which causes the gear train 21 and the reel 22 to rotate to wind the cable 67 onto the reel 22. The spring means (not shown) of the electrical conductor reel 65 tends to wind the electrical conductor 66 onto its reel, thereby shortening the conductor 66 as the cable 67 simultaneously pulls the boat onto the trailer. The cable 67 and the conductor 66 are wound on to their respective reels at speeds so that the operator 6 is continuously positioned adjacent the end of the boat to aid in guiding the boat onto the trailer as it is moved into position by the device.

As shown in Fig. 3, a suitable power source such as the car battery to which the trailer 3 is attached is electrically connected to the motor 19 through the solenoid 70' and is also connected to the cord 66 on the reel 65. The reel 65 is provided with a suitable power means such as a spring which tends to maintain the electric conductor or electric cord 66 wound thereon, but which spring means permits the electric conductor 66 to be pulled from the reel, as desired. A switch 68 is connected in the end of the electrical conductor 66, which switch is normally in open position so that no energy flows to the motor 19. However, the switch 68 is a pressure type switch which can be closed by pressing a finger thereagainst, and when the switch 68 is closed, electrical energy flows from the power source through the conductor 66 to the solenoid 70'. The reel 65 may be provided with a rotating type contact or any suitable means, so that the circuit to the solenoid 70' can be closed regardless of the extended or retracted position of the electric cord 66 on the reel 65.

When the switch 68 is closed, as previously mentioned, electrical energy flows to the solenoid 70' and this, in turn, actuates the switch associated therewith in a well known manner so that electrical energy may then flow to the motor 19. When energy flows to the motor 19, the gear train 21 is in turn actuated so as to rotate the winch 22.

To further amplify and describe the present invention, it will be assumed that the device is mounted on a boat trailer as shown in Fig. 1 of the drawings, and that the boat trailer is positioned adjacent a boat landing for pulling a boat onto the trailer. The pin 50 is initially retracted from the opening 51 and opening 52 and rotated so that it is in inactive or retracted position. The cable 67 which is initially wound on the reel 22 may then be manually unwound and is provided with suitable means such as a hook (not shown) to engage with the bow of the boat. The pin 50 may then be released from its engagement on surface 57 by rotating it to align projection 55 with slot 54, whereupon the pin 50 may be reinserted in the openings 51 and 52, so that the drive gear 33 and the plate 53 are locked together. The electrical cord 66 may be withdrawn or unwound manually from the reel 65 until the operator is positioned at a desired location adjacent the forward end of the boat 2 as shown in Fig. 1 of the drawings. The operator 6 may grasp the cord 66 in one hand and the end of the boat 2 with the other hand, as shown in Fig. 1 of the drawings, whereupon the switch 68 may be closed. When this occurs, power is supplied to the motor 19 so as to rotate the reel 22 to wind the cable 67 thereon. This pulls the boat 2 onto the trailer 3 and also since the power means or spring means connected to the reel 65 tends to always retract the cord 66, the reel 65 acts to wind the electrical cord 66 thereon as the boat is pulled on the trailer. Therefore, as the cable 67 is shortened to pull the boat 2 onto the trailer 3, the electrical cord 66 is also shortened so that the operator 6 may move alongside the boat 2 to continually guide it until it has reached its final position on the trailer 3. Since the cord 66 is wound onto the reel 65, it does not drop down into the water, nor does it become muddy, nor does it get in the way of the operator's legs or feet as he walks along the trailer From the foregoing description, it can be readily appreciated that the present invention provides a construction and arrangement so that one person can use the device to land or load a boat from the water 5, directly onto the trailer 3 The actuation of the motor 19 and the power or spring means of the reel 65 simultaneously, to cause the cable 67 to wind on the reel 22 to pull the boat 2 onto the trailer, while the electrical conductor 66 is being wound onto the reel 65, enables the operator to walk alongside the boat safely without fear of becoming entangled in the cord 66, and without the necessity of later attempting or endeavoring to clean the cord of mud or other debris by solvent or mechanical means which might tend to damage it.

Broadly the invention relates to a device for landing or loading a device on a trailer, and more particularly, to a power device for use with loading smaller boats on trailers by one person.

What is claimed is:

1. A mechanism for landing a boat on a trailer including, a reel with a cable thereon for engaging with a boat, power means for rotating said reel, gear means connecting said reel and power means to impart rotation to said reel to wind up the cable, support means mounted on the forward end of the trailer for said reel, power means and gear means, an electric cord reel mounted on said support and providing an electric cord which can be stretched to the end of the trailer, said electric cord having a switch thereon for activating said power means whereby said cable reel is rotated to pull the boat upon the trailer, and power means for rotating said electric cord reel so that said electric cord reel is rotated to wind up said electric cord as the boat moves on said trailer whereby the operator of the device may stand adjacent the forward end of the boat and guide it as it moves onto the trailer.

2. The combination recited in claim 1 including pin means connecting said gear means to said reel which may be retracted to disconnect said reel relative to said power and gear means so that the cable thereon can be unwound to connect it to a boat to be moved onto the trailer 3. A device which enables a boat to be loaded on a trailer by one person including a reel having a cable thereon for engagement with a boat, electric power means for rotating the reel to wind up the cable thereon and thereby pull the boat upon the trailer, an electric conductor reel having an electric conductor thereon which may be unwound so that the person operating the device may be located adjacent the boat and at a position remote to said power means, power means associated with said electric conductor reel to wind up said electric conductor as the boat moves on the trailer, switch means in said conductor for activating said electric power means to rotate said reel to wind said cable on said reel to pull the boat up on the trailer, said power means on said electric conductor reel acting to rotate said reel to wind the electric conductor on its reel whereby the operator of the device may be positioned adjacent the boat continually as it is moved onto the trailer to aid in guiding it into position on the trailer.

4. The combination recited in claim 3 including means for disconnecting said cable reel relative to its power means whereby said cable may be unwound manually to connect it to the boat for pulling onto the trailer.

5. A device which enables a boat to be loaded on a trailer by one person including, a supporting frame adapted to be mounted at the forward end of the trailer, a cable reel rotatably mounted in said frame for supporting a cable thereon whereby it may be unwound to be engaged with a boat and thereafter wound on the reel to pull the boat on the trailer, electric power means mounted on said frame, gear means rotatably mounted on said frame and connected with said reel, a drive connection between said power means and said gear means for imparting rotation to said gear means and connected reel, an electric cord reel mounted on said trailer for supporting an electric cord thereon whereby it may be unwound to enable the operator of the device to stand adjacent the boat as it is being pulled onto the trailer and wound on the reel as the boat is pulled up on the trailer whereby the operator may guide the boat as it moves into position on the trailer, a power means for rotating the electric cord reel, and switch means in the end of the electric cord whereby the operator may stand adjacent the boat and activate said power means for said cable reel to wind up said cable and electric cord reel power means simultaneously acting to wind said electric cord on its respective reel as the boat is pulled up on the trailer.

6. The combination recited in claim 5 including means for disconnecting said cable reel relative to said gear means whereby said cable reel may be manually rotated to unwind the cable thereon to engage it with the boat for pulling on the trailer.

References Cited in the file of this patent

UNITED STATES PATENTS

| 2,232,457 | Holland | Feb. 18, 1941 |
| 2,647,960 | Benjamin | Aug. 4, 1953 |
| 2,720,560 | Funk | Oct. 11, 1955 |
| 2,723,038 | Peterson et al. | Nov. 8, 1955 |